US009906478B2

(12) United States Patent
Akavaram et al.

(10) Patent No.: US 9,906,478 B2
(45) Date of Patent: Feb. 27, 2018

(54) SPLITTING POSTS IN A THREAD INTO A NEW THREAD

(71) Applicant: International Business Machines Corporation, Armonk, NY (US)

(72) Inventors: Vikrant Akavaram, Foster City, CA (US); Lisa M. Bradley, Cary, NC (US); Lillian Y. Lei, Moss Beach, CA (US); Lawrence Louie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 14/523,199

(22) Filed: Oct. 24, 2014

(65) Prior Publication Data

US 2016/0119265 A1    Apr. 28, 2016

(51) Int. Cl.
*G06F 15/16* (2006.01)
*H04L 12/58* (2006.01)
(Continued)

(52) U.S. Cl.
CPC .......... *H04L 51/16* (2013.01); *G06F 17/2785* (2013.01); *G06F 17/30705* (2013.01);
(Continued)

(58) Field of Classification Search
CPC ....... H04L 51/32; H04L 67/22; H04L 67/306; H04L 51/12–51/16; G06F 17/2785;
(Continued)

(56) References Cited

U.S. PATENT DOCUMENTS 7,669,123 B2   2/2010   Zuckerberg et al.
7,693,906 B1   4/2010   Amidon et al.
(Continued)

FOREIGN PATENT DOCUMENTS

CN   102105858 A   6/2011
CN   102204286 A   9/2011
CN   102388396 A   3/2012

OTHER PUBLICATIONS

Office Action for U.S. Appl. No. 141063,874 dated Feb. 12, 2015, pp. 1-21.
(Continued)

*Primary Examiner* — Brendan Higa
(74) *Attorney, Agent, or Firm* — Robert A. Voigt, Jr.; Winstead, P.C.

(57) ABSTRACT

A method, system and computer program product for improving social network users' interactions. The content of posts in a thread is analyzed so as to group the posts by topic. The posts directed to a specific topic are then analyzed to determine which users posted an initial post or a comment containing an ongoing question not answered. The users' profiles, liked pages and/or friends' graphs for the users involved in the analyzed posts are analyzed to determine any relationships among the users. Furthermore, past communication patterns and/or liked pages of the users are analyzed to determine the likelihood of responding to posts. The posts in the original thread are split into a new thread containing the group(s) of posts directed to a topic(s) having a group of users who would most likely participate in the new thread, where the group of users is selected based on the analysis discussed above.

14 Claims, 5 Drawing Sheets

(51) Int. Cl.
   *H04L 29/08* (2006.01)
   *H04L 12/12* (2006.01)
   *H04L 12/14* (2006.01)
   *G06F 17/30* (2006.01)
   *G06Q 50/00* (2012.01)
   *G06Q 10/10* (2012.01)
   *G06F 17/27* (2006.01)

(52) U.S. Cl.
   CPC ........... *G06Q 10/107* (2013.01); *G06Q 50/01* (2013.01); *H04L 12/12* (2013.01); *H04L 12/14* (2013.01); *H04L 51/32* (2013.01); *H04L 67/22* (2013.01); *H04L 67/306* (2013.01)

(58) Field of Classification Search
   CPC  G06F 17/30705; G06Q 10/107; G06Q 50/01; G06Q 10/10–10/103
   See application file for complete search history.

(56) References Cited

U.S. PATENT DOCUMENTS

| | | | |
|---|---|---|---|
| 7,743,340 B2 | 6/2010 | Horvitz et al. | |
| 7,962,555 B2 | 6/2011 | Sastry et al. | |
| 8,332,477 B1* | 12/2012 | Kaiserlian | H04L 51/16 709/206 |
| 8,560,554 B2 | 10/2013 | Gradin et al. | |
| 2008/0028027 A1 | 1/2008 | Jachner | |
| 2010/0017483 A1 | 1/2010 | Estrada | |
| 2010/0100904 A1 | 4/2010 | Kawakami et al. | |
| 2010/0153855 A1* | 6/2010 | Roberts | G06Q 10/107 715/752 |
| 2010/0268830 A1 | 10/2010 | McKee et al. | |
| 2011/0058101 A1* | 3/2011 | Earley | H04L 12/1822 348/461 |
| 2011/0225170 A1 | 9/2011 | Obasanjo et al. | |
| 2011/0282952 A1 | 11/2011 | Song | |
| 2012/0005221 A1 | 1/2012 | Ickman et al. | |
| 2012/0078917 A1* | 3/2012 | Gradin | G06F 17/30368 707/748 |
| 2012/0136866 A1 | 5/2012 | Carter et al. | |
| 2012/0143948 A1 | 6/2012 | Archambault et al. | |
| 2012/0151320 A1* | 6/2012 | McClements, IV | G06Q 10/101 715/230 |
| 2012/0158843 A1 | 6/2012 | Angani et al. | |
| 2012/0158863 A1 | 6/2012 | Kikin-Gil et al. | |
| 2012/0272160 A1* | 10/2012 | Spivack | G06Q 10/10 715/752 |
| 2012/0311033 A1 | 12/2012 | Tseng | |
| 2012/0317091 A1 | 12/2012 | Li | |
| 2013/0006973 A1* | 1/2013 | Caldwell | G06F 17/30719 707/723 |
| 2013/0024780 A1* | 1/2013 | Sutedja | G06Q 10/107 715/752 |
| 2013/0031034 A1 | 1/2013 | Gubin et al. | |
| 2013/0061156 A1 | 3/2013 | Olsen et al. | |
| 2013/0103667 A1 | 4/2013 | Minh | |
| 2013/0103773 A1* | 4/2013 | Tsukidate | H04L 51/12 709/206 |
| 2013/0124653 A1* | 5/2013 | Vick | H04L 51/32 709/206 |
| 2013/0212059 A1 | 8/2013 | Ameri-Yahia et al. | |
| 2013/0297689 A1 | 11/2013 | Bhat et al. | |
| 2014/0201216 A1* | 7/2014 | Bryant | G06Q 10/06311 707/748 |
| 2015/0081713 A1 | 3/2015 | Alonso et al. | |
| 2015/0281163 A1* | 10/2015 | Bastide | H04L 51/32 709/206 |
| 2016/0065519 A1* | 3/2016 | Waltermann | H04L 51/16 709/206 |
| 2016/0080485 A1* | 3/2016 | Hamedi | H04L 67/02 709/204 |

OTHER PUBLICATIONS

Office Action for U.S. Appl. No. 13/740,565 dated Feb. 11, 2015, pp. 1-20.
Office Action for U.S. Appl. No. 14/063,874 dated Nov. 19, 2015, pp. 1-18.
Office Action for U.S. Appl. No. 13/740,565 dated Nov. 18, 2015, pp. 1-18.
Office Action for U.S. Appl. No. 14/610,802 dated Sep. 23, 2016, pp. 1-39.
Office Action for U.S. Appl. No. 14/333,706 dated Sep. 22, 2016, pp. 1-49.
Office Action for U.S. Appl. No. 14/702,490 dated May 3, 2017, pp. 1-40.
List of IBM Patents or Patent Applications Treated as Related, 2015, pp. 1-2.
List of IBM Patents or Patent Applications Treated as Related, May 1, 2015, pp. 1-2.
Office Action for U.S. Appl. No. 13/740,565 dated Oct. 22, 2014, pp. 1-16.
Office Action for U.S. Appl. No. 141063,874 dated Oct. 22, 2014, pp. 1-17.
Balali et al., "A Supervised Approach to Predict the Hierarchical Structure of Conversation Threads for Comments," Hindawi Publishing Corporation, The Scientific World Journal, Tehran, Iran, IP.com, 3942392, Feb. 11, 2014, pp. 1-23, see abstract and pp. 1, 2, 3 and 4.
Microsoft, "Threaded IM," IPCOM000224899D, Jan. 10, 2013, pp. 1-4, see summary and p. 2.
"Introducing Zite 2.0," http://blog.zite.com/2012/12/04/introducing-zite-2-0, Dec. 4, 2012, pp. 1-4.
"MD5," http://en.wikipedia.org/wiki/MD5, 2013, pp. 1-18.
List of IBM Patents or Patent Applications Treated as Related, 2014, pp. 1-2.
Office Action for U.S. Appl. No. 14/610,802 dated Apr. 20, 2017, pp. 1-18.
Office Action for U.S. Appl. No. 14/333,706 dated Apr. 19, 2017, pp. 1-22.
Office Action for U.S. Appl. No. 141063,874 dated May 20, 2015, pp. 1-17.
Office Action for U.S. Appl. No. 13/740,565 dated May 19, 2015, pp. 1-12.
List of IBM Patents or Patent Applications Treated as Related, Aug. 21, 2017, pp. 1-2.

* cited by examiner

SPLITTING POSTS IN A THREAD INTO A NEW THREAD

TECHNICAL FIELD

The present invention relates generally to social network services, and more particularly to improving social network users' interactions by splitting posts in a thread into a new thread based on content of posts and selecting those users to participate in the new thread based on likelihood of continuing communication in the new thread.

BACKGROUND

A social network service is an online service, platform or site that focuses on building and reflecting of social networks or social relations among people (e.g., those who share interests and/or activities). A social network service essentially consists of a representation of each user (often a profile), his/her social links, and a variety of additional services. Most social network services are web-based and provide means for users to interact over the Internet, such as by e-mail and instant messaging. Social networking sites allow users to share ideas, activities, events, and interests within their individual networks.

Social networking sites (e.g., Facebook®) present to a particular user the posts and stories by other users in a social networking feed (referred to as a "news feed"). New postings or updates from friends and pages followed by the user (including photo tags, event updates, group memberships and other activity) will be reflected in the news feed. At times, some of the posts or updates in the thread of posts (i.e., the stream of posts in the social networking feed) include messages with multiple topics embedded within them which can lead to confusion for the user. Further confusion can result when other users start responding to one of the topics from the original post. As a result, it becomes difficult for the readers to understand which comments match which topic from the original post. The reader has to read back and forth between the comments and the original post to match them up. Such a process is inefficient in attempting to understand the flow of the conversation regarding a topic.

Additionally, there may be participants who post a comment with no desire to be further engaged in the conversation; whereas, there may be other participants who desire to continue the ongoing discussion. Unfortunately, the thread of posts (i.e., the stream of posts in the social networking feed) includes posts from users who desire to continue the ongoing discussion as well as the users who have no desire to be further engaged in the conversation. As a result, some of the participants or followers of the thread may be exposed to posts of a thread they have no interest in viewing.

Hence, the social network users' interactions can be confusing and frustrating at times due to the multiple topics involved in the posts as well as the inclusion of participants or followers of a thread that may be exposed to posts of a thread they have no interest in viewing.

BRIEF SUMMARY

In one embodiment of the present invention, a method for improving social network users' interactions comprises monitoring posts in an original thread of a social networking system to determine a history of interactions by topic. The method further comprises analyzing content of the monitored posts to group the monitored posts by topic, where a first group of the monitored posts directed to a first topic is posted by a first set of users. The method additionally comprises analyzing one or more of users' profiles, liked pages and friends' graphs for the first set of users to determine relationships among users of the first set of users. Furthermore, the method comprises analyzing one or more of past communication patterns and the liked pages of the first set of users to determine a likelihood of responding to posts. Additionally, the method comprises splitting, by a processor, posts in the original thread into a new thread containing the first group of the monitored posts directed to the first topic and having a second set of users of the first set of users to participate in the new thread, where each of the second set of users is selected based on the analysis of one or more of the users' profiles, liked pages and friends' graphs for the first set of users and the analysis of one or more of the past communication patterns and the liked pages of the first set of users, where each of the second set of users has a relationship with one or more users of the second set of users and has a likelihood of responding to a post that exceeds a threshold value.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for improving social network users' interactions. In one embodiment of the present invention, the content of posts monitored in a thread (i.e., the stream of posts in the social networking feed) is analyzed so as to group the monitored posts by topic. The posts directed to a specific topic are then analyzed to determine which users posted an initial post or a comment containing an ongoing question not answered or need for a follow-up response. Such users are identified as being more likely to participate in an ongoing discussion than other users. The users' profiles, liked pages and/or friends' graphs for the users involved in the analyzed posts are analyzed to determine any relationships (e.g., friends, family members) among the users. Users having a relationship among the other users involved in the analyzed posts are identified as being more likely to participate in an ongoing discussion than other users. Furthermore, past communication patterns of the users involved in the analyzed posts and/or their liked pages are analyzed to determine the likelihood of responding to posts. Those users with a higher likelihood of responding to posts may be more likely to participate in an ongoing discussion than other users. The posts in the original thread are split into a new thread containing the group(s) of posts directed to a topic(s) having a group of users participate in the new thread, where the group of users is selected based on the analysis discussed above, where each of the users in the group posts an initial post or a comment with an ongoing question or a need for a follow-up response in the group(s) of posts directed to a topic(s), has a relationship (e.g., friend) with one or more users in the group of users and has a likelihood of responding to a post that exceeds a threshold value. In this manner, the social network users' interactions are improved by splitting posts in a thread into a new thread directed to a specific topic(s) to advance readability and understandability of the thread as well as selecting those users to participate in the new thread who would most likely be interested in continuing an ongoing discussion.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
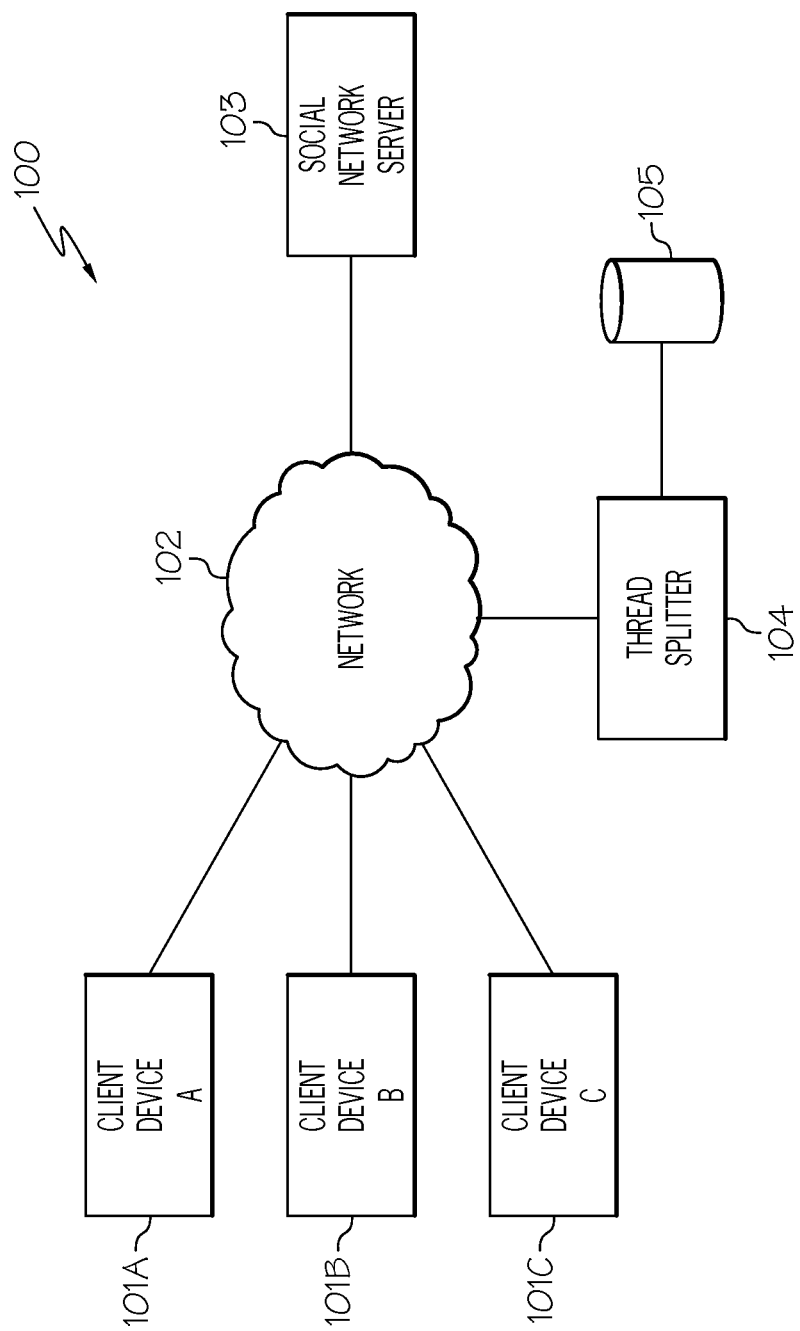
FIG. 1 illustrates a social network system configured in accordance with an embodiment of the present invention.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 103 is connected to network 102 by wire or wirelessly. While FIG. 1 illustrates a single social network server 103, it is noted for clarity that multiple servers may be used to implement the social networking and/or microblogging service.

System 100 further includes a thread splitter 104 connected to network 102 by wire or wirelessly. Thread splitter 104 is configured to improve social network users' interactions by splitting posts in a thread into a new thread based on the content of the posts and selecting those users to participate in the new thread based on posting an initial post or a comment containing an ongoing question not answered or need for a follow-up response in the original thread, being a friend to another user(s) who participate in the new thread and having a likelihood of responding to a post that exceeds a threshold value as discussed in further detail below. A description of the hardware configuration of thread splitter 104 is provided below in connection with FIG. 2.

Additionally, system 100 includes a database 105 for storing past communication posts by users which can be used to determine the likelihood of those users in responding to posts as discussed further below in connection with FIG. 3. In one embodiment, database 105 further stores information, including a list of the users that contributed a post in a thread directed to a particular topic, the actual posts in the thread directed to the particular topic, an indication as to whether there is a need for following-up the post in the thread directed to the particular topic with a response, a listing of the other users that contributed a post in the group of posts directed to the particular topic that the user has a relationship (e.g., friend relationship) and an indication (e.g., good chance, poor chance) as to the likelihood of the users responding to a post. Such information may be stored in tables in database 105.

System 100 is not to be limited in scope to any one particular network architecture. System 100 may include any number of clients 101, networks 102, social network servers 103, thread splitters 104 and databases 105. Furthermore, in one embodiment, thread splitter 104 may be part of client device 101 or social network server 103.

Figure 2:
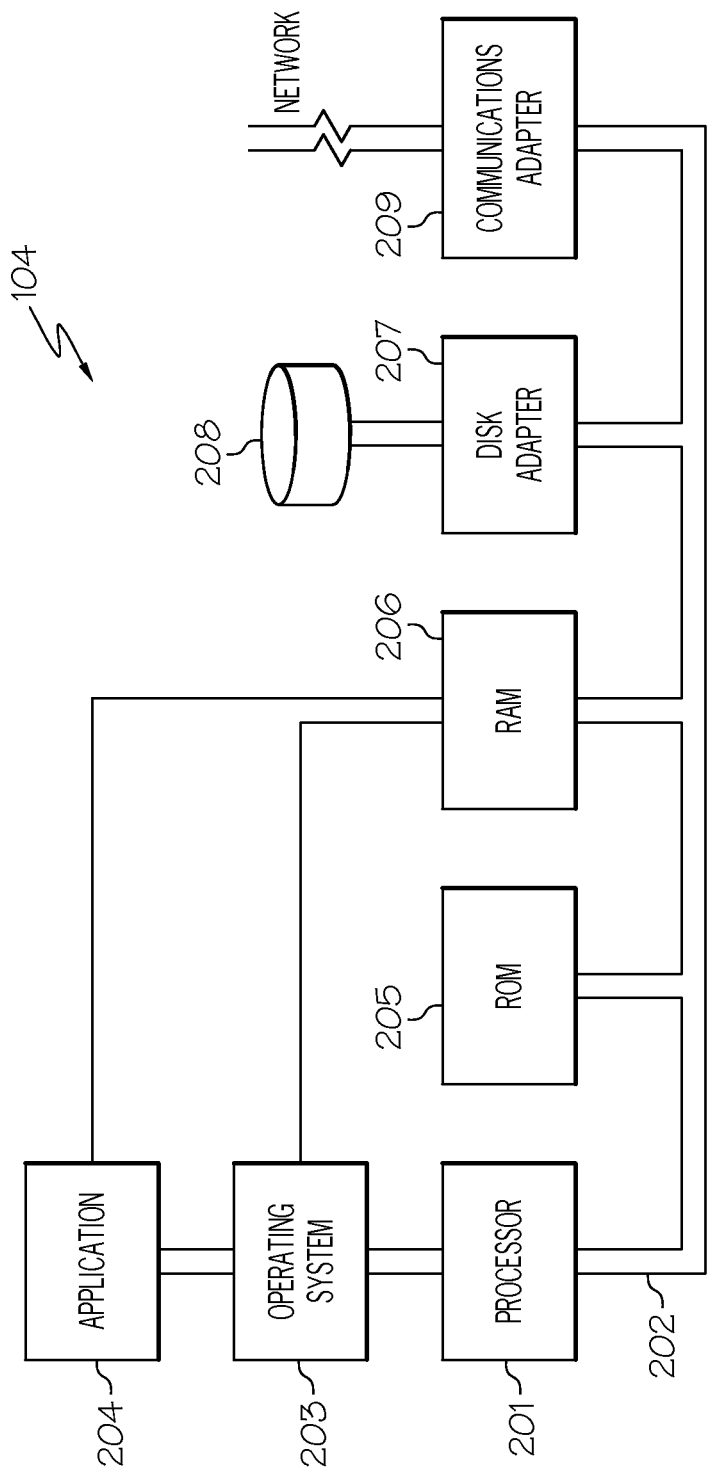
FIG. 2 illustrates a hardware configuration of a thread splitter configured in accordance with an embodiment of the present invention.

Referring now to FIG. 2, FIG. 2 illustrates a hardware configuration of a thread splitter 104 (FIG. 1) which is representative of a hardware environment for practicing the present invention. Referring to FIG. 2, thread splitter 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for improving social network users' interactions as discussed further below in association with FIGS. 3-5.

Referring again to FIG. 2, read-only memory ("ROM") 205 is coupled to system bus 202 and includes a basic input/output system ("BIOS") that controls certain basic functions of thread splitter 104. Random access memory ("RAM") 206 and disk adapter 207 are also coupled to system bus 202. It should be noted that software components including operating system 203 and application 204 may be loaded into RAM 206, which may be thread splitter's 104 main memory for execution. Disk adapter 207 may be an integrated drive electronics ("IDE") adapter that communicates with a disk unit 208, e.g., disk drive. It is noted that the program for improving social network users' interactions, as discussed further below in association with FIGS. 3-5, may reside in disk unit 208 or in application 204.

Thread splitter 104 may further include a communications adapter 209 coupled to bus 202. Communications adapter 209 interconnects bus 202 with an outside network (e.g., network 102 of FIG. 1) thereby allowing thread splitter 104 to communicate with client devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, social networking sites (e.g., Facebook®) present to a particular user the posts and stories by other users in a social networking feed (referred to as a "news feed"). New postings or updates from friends and pages followed by the user (including photo tags, event updates, group memberships and other activity) will be reflected in the news feed. At times, some of the posts or updates in the thread of posts (i.e., the stream of posts in the social networking feed) include messages with multiple topics embedded within them which can lead to confusion for the user. Further confusion can result when other users start responding to one of the topics from the original post. As a result, it becomes difficult for the readers to understand which comments match which topic from the original post. The reader has to read back and forth between the comments and the original post to match them up. Such a process is inefficient in attempting to understand the flow of the conversation regarding a topic. Additionally, there may be participants who post a comment with no desire to be further engaged in the conversation; whereas, there may be other participants who desire to continue the ongoing discussion. Unfortunately, the thread of posts (i.e., the stream of posts in the social networking feed) includes posts from users who desire to continue the ongoing discussion as well as the users who have no desire to be further engaged in the conversation. As a result, some of the participants or followers of the thread may be exposed to posts of a thread they have no interest in viewing. Hence, the social network users' interactions can be confusing and frustrating at times due to the multiple topics involved in the posts as well as the inclusion of participants or followers of a thread that may be exposed to posts of a thread they have no interest in viewing.

Figure 3:
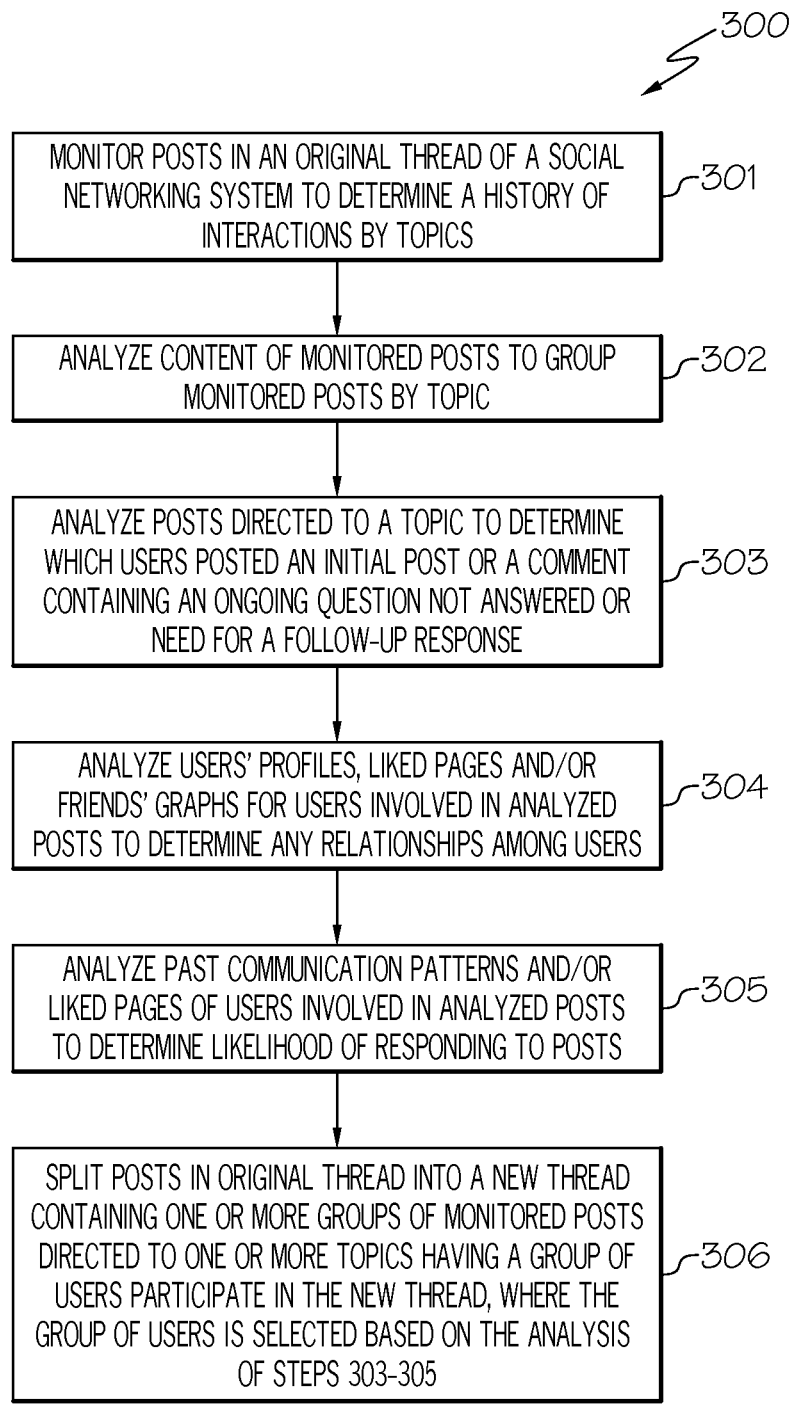
FIG. 3 is a flowchart of a method for improving social network users' interactions by splitting posts in a thread into a new thread based on the content of the posts and selecting those users to participate in the new thread based on relationships among the users and the likelihood of continuing communication in the new thread in accordance with an embodiment of the present invention.
Figure 4:
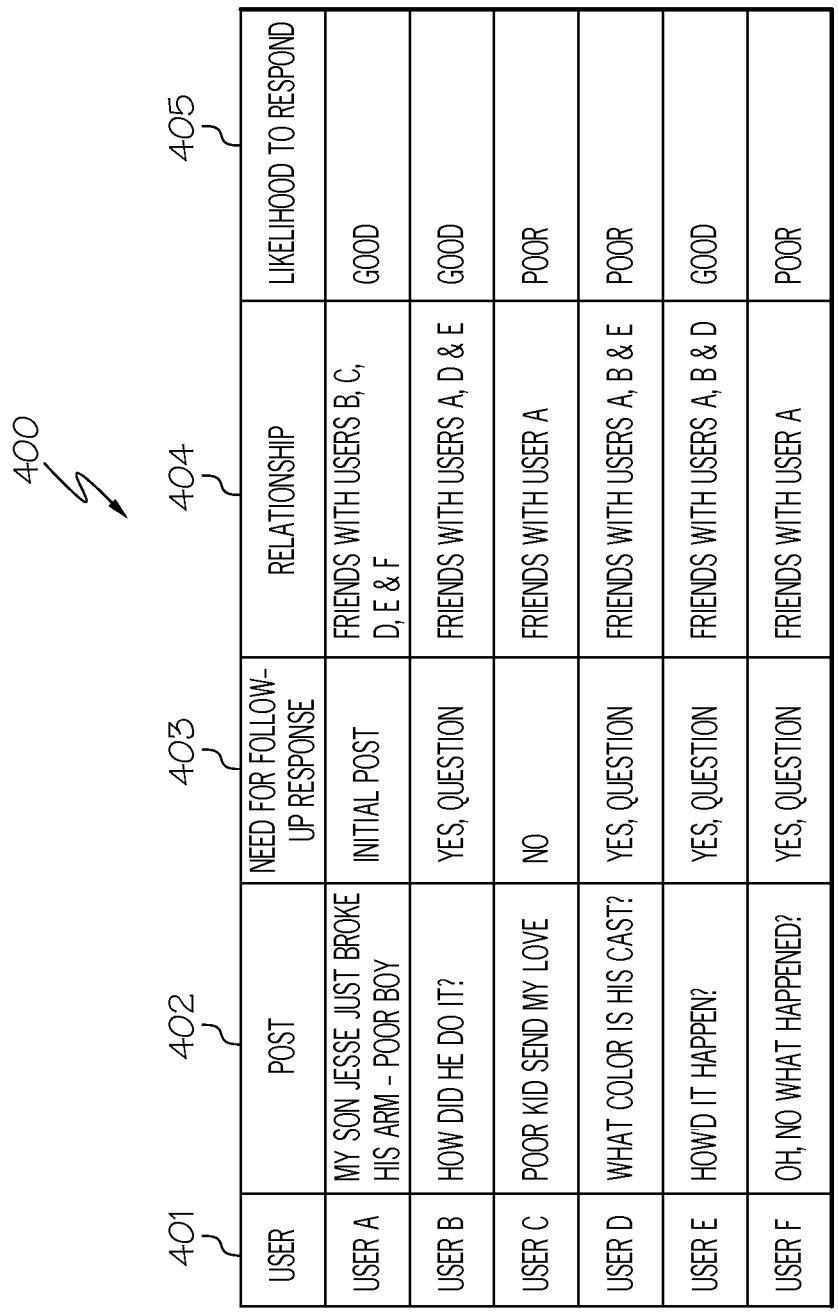
FIG. 4 is a table illustrating selecting users to participate in the new thread based on posting an initial post or a comment containing an ongoing question not answered or need for a follow-up response in the original thread, having a relationship with another user(s) who participate in the new thread and having a likelihood of responding to a post that exceeds a threshold value in accordance with an embodiment of the present invention.
Figure 5:
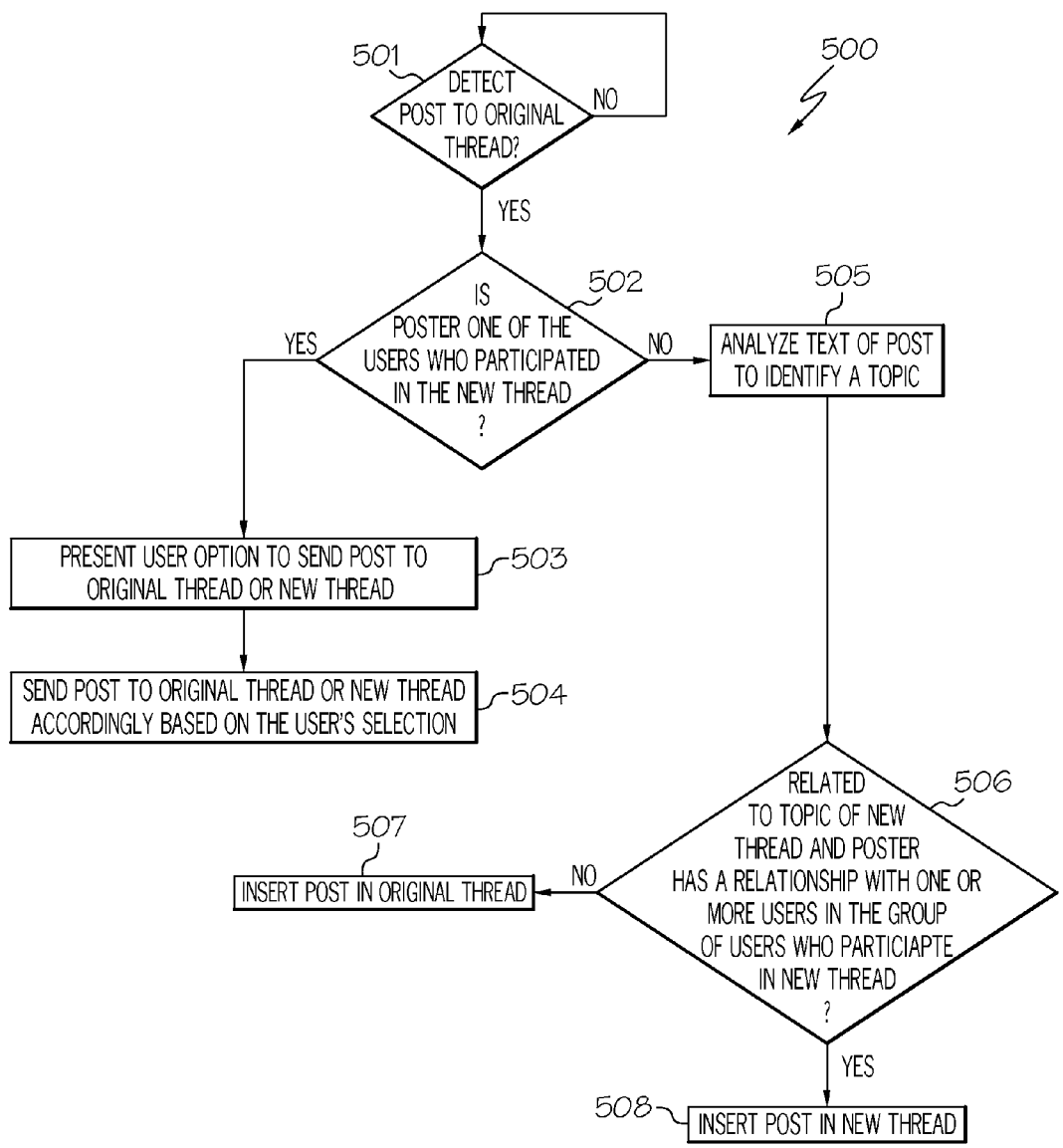
FIG. 5 is a flowchart of a method for handling a new post to the original thread after the new thread is created in accordance with an embodiment of the present invention.

The principles of the present invention provide a means for improving social network users' interactions by splitting posts in a thread into a new thread based on the content of the posts and selecting those users to participate in the new thread who would most likely be interested in continuing communication in the new thread based on posting an initial post or a comment containing an ongoing question not answered or need for a follow-up response in the original thread, having a relationship with another user(s) who participate in the new thread and having a likelihood of responding to a post that exceeds a threshold value as discussed below in association with FIGS. 3-5. FIG. 3 is a flowchart of a method for improving social network users' interactions by splitting posts in a thread into a new thread based on the content of the posts and selecting those users to participate in the new thread based on relationships among the users and the likelihood of continuing communication in the new thread. FIG. 4 is a table illustrating selecting users to participate in the new thread based on posting an initial post or a comment containing an ongoing question not answered or need for a follow-up response in the original thread, having a relationship with another user (s) who participate in the new thread and having a likelihood of responding to a post that exceeds a threshold value. FIG. 5 is a flowchart of a method for handling a new post to the original thread after the new thread is created.

As stated above, FIG. 3 is a flowchart of a method 300 for improving social network users' interactions by splitting posts in a thread into a new thread based on the content of the posts and selecting those users to participate in the new thread based on relationships among the users and the likelihood of continuing communication in the new thread in accordance with an embodiment of the present invention.

Referring to FIG. 3, in conjunction with FIGS. 1-2, in step 301, thread splitter 104 monitors posts in an original thread (e.g., stream of posts in a social networking feed) of a social networking system (e.g., Facebook®) to determine a history of interactions by topics.

In step 302, thread splitter 104 analyzes the content of the monitored posts to group the monitored posts by topic. In one embodiment, thread splitter 104 analyzes the monitored posts for topics using natural language processing. As discussed above, posts in a thread (i.e., the stream of posts in the social networking feed) may include multiple topics. A "topic" refers to a subject of a conversation or discussion in the posted message. For example, thread splitter 104 may identify one or more topics in the posted message by focusing on keywords, such as "travel," "sports," and "cars," when analyzing the message using natural language processing. Thread splitter 104 then groups the posts by topic. For example, thread splitter 104 may group one set of posts in the thread directed to travel and group another set of posts in the thread directed to cars.

In step 303, thread splitter 104 analyzes the posts directed to a topic to determine which users posted an initial post or a comment containing an ongoing question not answered or need for a follow-up response. In one embodiment, thread splitter 104 analyzes the posts directed to a topic to determine if there are any ongoing questions not answered or need for follow-up responses using natural language processing. For example, thread splitter 104 may identify any posts that include a question mark. For instance, the post of "What color is his cast?" would be identified as a question by thread splitter 104 based on identifying the question mark. Furthermore, thread splitter 104 would determine whether the question was answered based on responses that include words directed to a color (e.g., green) used in connection with the term "cast" that would be a possible answer to the original post (e.g., "What color is his cast?"). Thread splitter 104 derives meaning from the posted question using natural language processing and therefore can determine if there are any ongoing questions not answered or need for follow-up responses. For instance, suppose that a user posted the message "What size bat do you use?" The term "bat" may be interpreted as corresponding to a flying mammal or to a wooden instrument for hitting a baseball. Since the phrase "do you use" was used in connection with the term "bat," it may be deduced that the term "bat" refers to the wooden instrument used for hitting a baseball as opposed to a flying mammal. Such processing may be used to identify the appropriate meaning in the posted message and therefore will be able to determine if there was a response to the question. Thread splitter 104 identifies the initial post as well as any posts with an ongoing question not answered or need for a follow-up response in order to identify those users who made such a post since they would be more likely interested in participating in an ongoing discussion.

In step 304, thread splitter 104 analyzes the users' profiles, liked pages and/or friends' graphs for the users involved in the analyzed posts of step 303 to determine any relationships (e.g., friends, family members) among the users. A user profile refers to a social profile that stores a description of the characteristics of a person, including a listing of friends, family members, etc., which may be maintained by the social networking system. Such a user profile may be publicly available from the social networking system and acquired by thread splitter 104. The user's "liked pages," refer to the pages (social media pages) that a user has indicated they liked, such as a musician or athlete they want to connect and hear from. The user's friends' graphs refer to a graph that indicates the user's friends. In one embodiment, the users' profiles, liked pages and/or friends' graphs for the users involved in the analyzed posts of step 303 are analyzed to determine any relationships (e.g., friends, family members) among the users using natural language processing. For example, thread splitter 104 may identify relationships by focusing on keywords, such as "friend," "mother," and "brother." Those users with a relationship may be more likely to participate in an ongoing discussion than other users.

In step 305, thread splitter 104 analyzes past communication patterns and/or liked pages of users involved in the analyzed posts of step 303 to determine the likelihood of responding to posts. For example, past communications, such as past postings by users involved in the analyzed posts of step 303, may be stored in database 105. These postings may be analyzed to determine the likelihood of responding to posts using natural language processing. For example, it may be determined that the user does not post to a follow-on post or question. Hence, such a user would have a low likelihood of responding to posts. In another example, it may be determined that the user is very active in posting responses to follow-on posts or questions. Hence, such a user would have a high likelihood of responding to posts. Furthermore, the users' liked pages may be analyzed using natural language processing to determine if the users have a preference for a particular topic, such as one of the topics identified in step 302. For example, if one of the topics in the set of posts is directed to cars, and the user has liked five pages (social media pages) directed to cars, then it may be inferred that the user is more likely to respond to posts involving the topic of cars than if the user had not liked any pages directed to cars. In one embodiment, a score may be assigned, such as on the basis of 0 to 100, with a score of 100 corresponding to a 100% chance of responding to posts and a score of 0 corresponding to a 0% chance of responding to posts. Such a score may be compared to a threshold value, as discussed further below, to determine whether such a user should be a user to participate in the new thread formed by thread splitter 104. Those users with a higher likelihood of responding to posts may be more likely to participate in an ongoing discussion than other users.

In step 306, thread splitter 104 splits the posts in the original thread (e.g., stream of posts in a social networking feed) into a new thread containing one or more groups of monitored posts directed to one or more topics having a group of users participate in the new thread, where the group of users is selected based on the analysis of steps 303-305, where each of the users in the group posts an initial post or a comment with an ongoing question or need for a follow-up response in the group(s) of posts directed to a topic(s), has a relationship (e.g., friend) with one or more users in the group of users and has a likelihood of responding to a post that exceeds a threshold value. For example, posts in the original thread directed to a particular topic (e.g., travel to Bulgaria) may be split into a new thread having a group of users participate in the new thread selected based on the analysis of steps 303-305, where such users have each posted an original post or a comment with an ongoing question or need for a follow-up response, has a relationship (e.g., friend) with one or more users in the group of users and has a likelihood of responding to a post that exceeds a threshold value. In this manner, the social network users' interactions are improved by splitting posts in a thread into a new thread directed to a specific topic(s) to advance readability and understandability of the thread as well as selecting those users to participate in the new thread who would most likely be interested in continuing an ongoing discussion, such as those users who posted the initial post or a comment containing an ongoing question not answered or need for a follow-up response in the original thread, who have a relationship with another user(s) who participate in the new thread and have a likelihood of responding to a post that exceeds a threshold value. While the foregoing discusses using the analysis of steps 303-305 to select those users to participate in the new thread, such a selection may be made based on only one or more of these steps, such as only using the analysis of steps 304 and 305 to select those users to participate in the new thread. An illustration of selecting which users to participate in the new thread is provided in FIG. 4.

FIG. 4 is a table 400 illustrating selecting users to participate in the new thread based on posting an initial post or a comment containing an ongoing question not answered or need for a follow-up response in the original thread, having a relationship (e.g., friend) with another user(s) who participate in the new thread and having a likelihood of responding to a post that exceeds a threshold value in accordance with an embodiment of the present invention. In one embodiment, table 400 is stored in database 105 with the information in table 400 being acquired in the analysis discussed above.

Referring to FIG. 4, in conjunction with FIG. 3, table 400 includes a column 401 for the users who posted a message(s) in a group of monitored posts directed to a topic (e.g., Jesse broke his arm), a column 402 that includes the posts by the users indicated in column 401, a column 403 that indicates whether the corresponding post in column 402 is an initial post or needs a follow-up response, a column 404 that indicates which users out of all the users listed in column 401 the user in column 401 has a relationship (e.g., friend relationship), and a column 405 that indicates whether the likelihood of the user listed in column 401 has a good or poor chance in responding to a post based on the score assigned in step 305.

As illustrated in FIG. 4, thread splitter 104 determines that users A, B, C, D, E and F have posted a message directed to a topic (e.g., Jesse broke his arm), where such posts have been grouped in step 302. As further illustrated in FIG. 4, thread splitter 104 determined that posts made by users B, D, E and F require a response and that the post made by user A was an initial post in step 303. Furthermore, thread splitter 104 determines any relationships (e.g., friend relationship) each user has with the other users that contributed a post in the group of posts directed to the topic of Jesse breaking his arm in step 304. For example, user A is friends with users B, C, D, E and F. User B is friends with users A, D and E. User C is friends with user A. User D is friends with users A, B and E. User E is friends with users A, B and D. User F is friends with user A. Additionally, thread splitter 104 indicates whether the user has a good or a poor chance in responding to a post based on the score assigned in step 305.

In the example of FIG. 4, a new thread containing the posts directed to the topic of Jesse breaking his arm would have users A, B and E participate. User C was not selected since user C did not post a message that required a follow-up response. Furthermore, users C, D and F were not selected since they have a poor chance in responding to a post.

While the foregoing example discusses grouping posts in an original thread into a new thread based on a single topic in step 306, the principles of the present invention may be extended to grouping posts in the original thread based on more than one topic provided that all of the users selected to participate in the new thread posted an original post or a comment with an ongoing question or need for a follow-up response in both groups of posts directed to both topics, has a relationship (e.g., friend) with one or more users in the set of users selected to participate in the new thread and has a likelihood of responding to a post that exceeds a threshold value.

After establishing the new thread, a new post may be posted to the original thread. A method for handling such a post is discussed below in connection with FIG. 5.

FIG. 5 is a flowchart of a method 500 for handling a new post to the original thread after the new thread is created in accordance with an embodiment of the present invention.

Referring to FIG. 5, in conjunction with FIGS. 1-4, in step 501, a determination is made by thread splitter 104 as to whether it detected a message posted to the original thread following the creation of the new thread discussed above.

If a new message has not been posted to the original thread following the creation of the new thread, then thread splitter 104 continues to determine whether it detected a message posted to the original thread following the creation of the new thread in step 501.

If, however, thread splitter 104 detected a message posted to the original thread following the creation of the new thread, then, in step 502, a determination is made by thread splitter 104 as to whether the poster is one of the users within the group of users who participated in the new thread.

If the poster is a user within the group of users who participated in the new thread, then, in step 503, thread splitter 104 presents the user the option to send the post to the original thread or to the new thread. For example, referring to the example of FIG. 4, suppose that the poster was user B who is one of the users (A, B and E) selected to participate in the new thread (thread directed to the topic of Jesse breaking his arm). In such a case, user B would be presented the option to send the post to the original thread or to the new thread.

In step 504, thread splitter 104 sends the post to the original thread or to the new thread accordingly based on the user's selection.

If, however, the poster is not a user within the group of users who participated in the new thread, then, in step 505, thread splitter 104 analyzes the text in the post, such as via natural language processing, to determine a topic. A discussion regarding determining a topic in a post using natural language processing was discussed above and will not be reiterated for the sake of brevity.

In step 506, a determination is made by thread splitter 104 as to whether the topic of the post is related to the topic of the new thread and whether the poster has a relationship (e.g., friend relationship) with one or more users in the group of users who participate in the new thread. In one embodiment, the relatedness of a topic may be determined using natural language processing based on identifying keywords in the post and determining if the identified keywords have a meaning similar to the topic of the new thread. Furthermore, a determination may be made as to whether the poster has a relationship with one or more users in the group of users who participate in the new thread by analyzing the users' (all of the users, including the poster and the group of users who participate in the new thread) profiles, liked pages and/or friends' graphs as discussed above.

If the topic of the post is not related to the topic of the new thread or the poster does not have a relationship with a user in the group of users who participate in the new thread, then, in step 507, thread splitter 104 inserts the post in the original thread.

If, however, the topic of the post is related to the topic of the new thread and the poster has a relationship with one or more users in the group of users who participate in the new thread, then, in step 508, thread splitter 104 inserts the post in the new thread.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for improving social network users' interactions, the computer program product comprising a computer readable storage medium having program code embodied therewith, the program code comprising the programming instructions for:
   monitoring posts in an original thread of a social networking system to determine a history of interactions by topic;
   analyzing content of said monitored posts to group said monitored posts by topic, wherein a first group of said monitored posts directed to a first topic is posted by a first set of users;
   analyzing one or more of users' profiles, liked pages and friends' graphs for said first set of users to determine relationships among users of said first set of users;
   analyzing one or more of past communication patterns and said liked pages of said first set of users to determine a likelihood of responding to posts; and
   splitting posts in said original thread into a new thread containing said first group of said monitored posts directed to said first topic and having a second set of users of said first set of users to participate in said new thread, wherein each of said second set of users is selected based on said analysis of one or more of said users' profiles, liked pages and friends' graphs for said first set of users and said analysis of one or more of said past communication patterns and said liked pages of said first set of users, wherein each of said second set of users has a relationship with one or more users of said second set of users and has a likelihood of responding to a post that exceeds a threshold value.

2. The computer program product as recited in claim 1, wherein the program code further comprises the programming instructions for:
   analyzing said first group of said monitored posts posted by said first set of users directed to said first topic to determine which users of said first set of users posted an initial post or a comment containing an ongoing question not answered or need for a follow-up response;

wherein each of said second set of users is selected based on said analysis of said first group of said monitored posts posted by said first set of users directed to said first topic, said analysis of one or more of said users' profiles, liked pages and friends' graphs for said first set of users and said analysis of one or more of said past communication patterns and said liked pages of said first set of users.

3. The computer program product as recited in claim 1, wherein the program code further comprises the programming instructions for:
    detecting a post from a user to said original thread.

4. The computer program product as recited in claim 3, wherein the program code further comprises the programming instructions for:
    presenting said user an option to send said post to said original thread or said new thread in response to said user being a user of said second set of users.

5. The computer program product as recited in claim 3, wherein the program code further comprises the programming instructions for:
    analyzing text of said post to identify a topic; and
    inserting said post in said new thread in response to said topic of said post being related to said first topic and said user has a relationship with one or more users of said second set of users.

6. The computer program product as recited in claim 3, wherein the program code further comprises the programming instructions for:
    inserting said post in said original thread in response to said user not having a relationship with a user of said second set of users or a topic of said post not being related to said first topic.

7. The computer program product as recited in claim 1, wherein said analysis of said content of said monitored posts, said analysis of one or more of said users' profiles, liked pages and friends' graphs for said first set of users and said analysis of one or more of said past communication patterns and said liked pages of said first set of users uses natural language processing.

8. A system, comprising:
    a memory unit for storing a computer program for improving social network users' interactions; and
    a processor coupled to the memory unit, wherein the processor is configured to execute the program instructions of the computer program comprising:
        monitoring posts in an original thread of a social networking system to determine a history of interactions by topic;
        analyzing content of said monitored posts to group said monitored posts by topic, wherein a first group of said monitored posts directed to a first topic is posted by a first set of users;
        analyzing one or more of users' profiles, liked pages and friends' graphs for said first set of users to determine relationships among users of said first set of users;
        analyzing one or more of past communication patterns and said liked pages of said first set of users to determine a likelihood of responding to posts; and
        splitting posts in said original thread into a new thread containing said first group of said monitored posts directed to said first topic and having a second set of users of said first set of users to participate in said new thread, wherein each of said second set of users is selected based on said analysis of one or more of said users' profiles, liked pages and friends' graphs for said first set of users and said analysis of one or more of said past communication patterns and said liked pages of said first set of users, wherein each of said second set of users has a relationship with one or more users of said second set of users and has a likelihood of responding to a post that exceeds a threshold value.

9. The system as recited in claim 8, wherein the program instructions of the computer program further comprises:
    analyzing said first group of said monitored posts posted by said first set of users directed to said first topic to determine which users of said first set of users posted an initial post or a comment containing an ongoing question not answered or need for a follow-up response;
    wherein each of said second set of users is selected based on said analysis of said first group of said monitored posts posted by said first set of users directed to said first topic, said analysis of one or more of said users' profiles, liked pages and friends' graphs for said first set of users and said analysis of one or more of said past communication patterns and said liked pages of said first set of users.

10. The system as recited in claim 8, wherein the program instructions of the computer program further comprises:
    detecting a post from a user to said original thread.

11. The system as recited in claim 10, wherein the program instructions of the computer program further comprises:
    presenting said user an option to send said post to said original thread or said new thread in response to said user being a user of said second set of users.

12. The system as recited in claim 10, wherein the program instructions of the computer program further comprises:
    analyzing text of said post to identify a topic; and
    inserting said post in said new thread in response to said topic of said post being related to said first topic and said user has a relationship with one or more users of said second set of users.

13. The system as recited in claim 10, wherein the program instructions of the computer program further comprises:
    inserting said post in said original thread in response to said user not having a relationship with a user of said second set of users or a topic of said post not being related to said first topic.

14. The system as recited in claim 8, wherein said analysis of said content of said monitored posts, said analysis of one or more of said users' profiles, liked pages and friends' graphs for said first set of users and said analysis of one or more of said past communication patterns and said liked pages of said first set of users uses natural language processing.

* * * * *